(12) United States Patent
Taguchi

(10) Patent No.: US 6,573,973 B2
(45) Date of Patent: Jun. 3, 2003

(54) SYSTEM FOR INSERTING ADDITIONAL MOVING PICTURE DATA INTO MOVING PICTURE DATA THAT ARE BEING COMMUNICATED BETWEEN TERMINALS

(75) Inventor: Kiyoshi Taguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/908,553

(22) Filed: Jul. 20, 2001

(65) Prior Publication Data

US 2002/0021414 A1 Feb. 21, 2002

(30) Foreign Application Priority Data

Aug. 24, 2000 (JP) ........................................ 2000-245842

(51) Int. Cl.⁷ ................................................ H04N 7/14
(52) U.S. Cl. .................... 352/244; 348/14.01; 348/14.1
(58) Field of Search .......................... 352/244; 345/629; 348/14.02, 14.07

(56) References Cited

U.S. PATENT DOCUMENTS

| | | | | |
|---|---|---|---|---|
| 5,453,780 A | * | 9/1995 | Chen et al. ............... | 348/14.01 |
| 5,627,825 A | * | 5/1997 | Barraclough et al. .... | 348/14.09 |
| 5,896,128 A | * | 4/1999 | Boyer ......................... | 345/716 |
| 6,306,039 B1 | * | 10/2001 | Kaji et al. .................. | 345/418 |
| 6,373,516 B1 | * | 4/2002 | Kim ........................... | 348/14.01 |

FOREIGN PATENT DOCUMENTS

| | | |
|---|---|---|
| JP | 5-83364 | 4/1993 |
| JP | 10-271469 | 10/1998 |
| JP | 11-187468 | 7/1999 |
| JP | 11-284705 | 10/1999 |
| JP | 2000-156761 | 6/2000 |

\* cited by examiner

Primary Examiner—Russell Adams
Assistant Examiner—D. Ben Esplin
(74) Attorney, Agent, or Firm—McGinn & Gibb, PLLC

(57) ABSTRACT

An exchange is provided with a data synthesizer that synthesizes moving picture data that are being communicated between terminals with additional moving picture data, and is capable of inserting the additional moving picture data into the moving picture data that are being communicated. Each terminal is provided with a data transmission/reception means that both synthesizes the moving picture data that are being transmitted to the terminal of a communication partner with the additional moving picture data and synthesizes moving picture data that have been transmitted in from the terminal of a communication partner with additional moving picture data; and is capable of inserting additional moving picture data into the moving picture data when the moving picture data are being transmitted or received. In a case in which additional moving picture data are inserted into moving picture data that are being communicated between terminals, the additional moving picture data are inserted into the moving picture data that are being communicated at either the terminals or the exchange.

27 Claims, 6 Drawing Sheets

SYSTEM FOR INSERTING ADDITIONAL MOVING PICTURE DATA INTO MOVING PICTURE DATA THAT ARE BEING COMMUNICATED BETWEEN TERMINALS

BACKGROUND OF THE INVENTION

1. Field of the Invention

The present invention relates to a moving picture insertion system for inserting separate moving picture data into moving picture data during communication between terminals.

2. Description of the Related Art

In the technical field for portable telephones capable of communicating moving picture data, technology has been developed in recent years for synthesizing moving picture data. This technology is disclosed in, for example, Japanese Patent Laid-open Publication No. 284705/99.

However, the technology that is disclosed in this laid-open patent publication is for pasting a fixed image or characters on the liquid crystal display of a portable telephone and does not synthesize the data of two moving images.

SUMMARY OF THE INVENTION

It is an object of the present invention to provide a moving picture insertion system that can synthesize moving picture data.

In the present invention, an exchange is provided with: a data transmitter/receiver for carrying out transmission/reception of moving picture data that are being communicated between terminals; and a data synthesizer for synthesizing moving picture data that have been received by the data transmitter/receiver with additional moving picture data. Additional moving picture data can thus be inserted into moving picture data that are being communicated between terminals.

In addition, each terminal is provided with a data transmitter/receiver that both synthesizes moving picture data that are being transmitted to the terminal of a communication partner with additional moving picture data and synthesizes moving picture data that have been transmitted in from the terminal of a communication partner with additional moving picture data. Moving picture data can thus be synthesized with additional moving picture data when the moving picture data is being transmitted or received.

Thus, in the present invention, additional moving picture data can be inserted into moving picture data at either a terminal or an exchange while the moving picture data are being communicated between terminals.

If a control terminal is provided that transmits to an exchange additional moving picture data that are to be inserted into moving picture data that are being communicated, various types of moving picture data can be inserted into moving picture data that are being communicated.

The above and other objects, features, and advantages of the present invention will become apparent from the following description based on the accompanying drawings which illustrate examples of preferred embodiments of the present invention.

DETAILED DESCRIPTION OF THE PREFERRED EMBODIMENTS

First Embodiment

Figure 1:
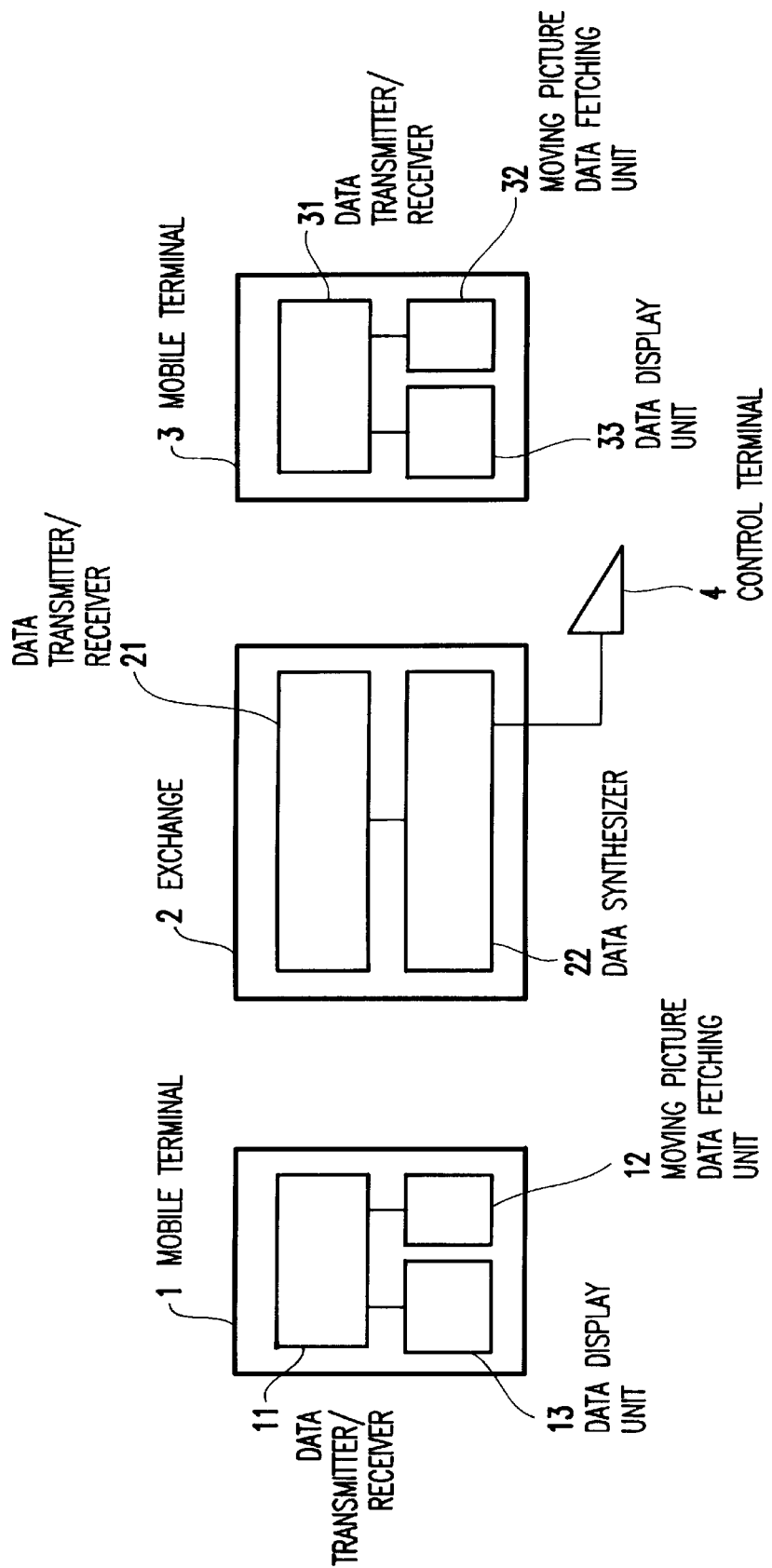
FIG. 1 shows the moving picture insertion system according to the first embodiment of the present invention.

We refer now to FIG. 1, in which is shown the moving picture insertion system according to the first embodiment of the present invention. This system includes: mobile terminals 1 and 3, exchange 2, and control terminal 4; wherein the communication of moving picture data is performed between mobile terminals 1 and 3 by way of exchange 2. Radio communication is effected between mobile terminals 1 and 3 and exchange 2.

Mobile terminal 1 is a terminal capable of sending and receiving moving picture data and includes data transmitter/receiver 11, moving picture data fetching unit 12, and data display unit 13.

Data transmitter/receiver 11 performs processes of transmitting and receiving moving picture data that are transmitted to and received from exchange 2 and a process of synthesizing the moving picture data, directs the display of moving picture data to moving picture data display unit 13, and performs a process of receiving moving picture data from moving picture data fetching unit 12.

Moving picture data fetching unit 12 fetches moving picture data and transmits the data to data transmitter/receiver 11.

Data display unit 13 displays moving picture data based on display instructions from data transmitter/receiver 11.

Exchange 2 is a device for controlling communication of moving picture data between mobile terminals 1 and 3, and includes data transmitter/receiver 21 and data synthesizer 22.

Data transmitter/receiver 21 carries out the processes of transmitting and receiving moving picture data that are transmitted to and received from mobile terminals 1 and 3, and the processes of transmitting and receiving moving picture data that are transmitted to and received from data synthesizer 22.

Data synthesizer 22 performs the processes of transmitting and receiving moving picture data that are transmitted to and received from data transmitter/receiver 21, the process of synthesizing moving picture data, and the process of receiving moving picture data from control terminal 4.

Control terminal 4 sends to data synthesizer 22 inside exchange 2 additional moving picture data that are to be inserted into moving picture data.

Mobile terminal 3 is a terminal capable of sending and receiving moving picture data and includes data transmitter/receiver 31, moving picture data fetching unit 32, and data display unit 33.

Data transmitter/receiver 31 carries out processes of transmitting and receiving moving picture data that are transmitted to and received from exchange 2, performs synthesizing of moving picture data, directs the display of moving picture data to moving picture data display unit 33, and performs the process of receiving moving picture data from moving picture data fetching unit 32.

Moving picture data fetching unit 32 fetches moving picture data and transmits to data transmitter/receiver 31.

Data display unit 33 displays moving picture data based on the display instructions from data transmitter/receiver 31.

Referring now to flow charts, an explanation is next presented regarding the operations of the moving picture insertion system that is configured according to the foregoing explanation. Although the following explanation regards a case in which moving picture data are transmitted from mobile terminal 1 to mobile terminal 3, the same operations are carried out in a case in which moving picture data are transmitted from mobile terminal 3 to mobile terminal 1.

Figure 2:
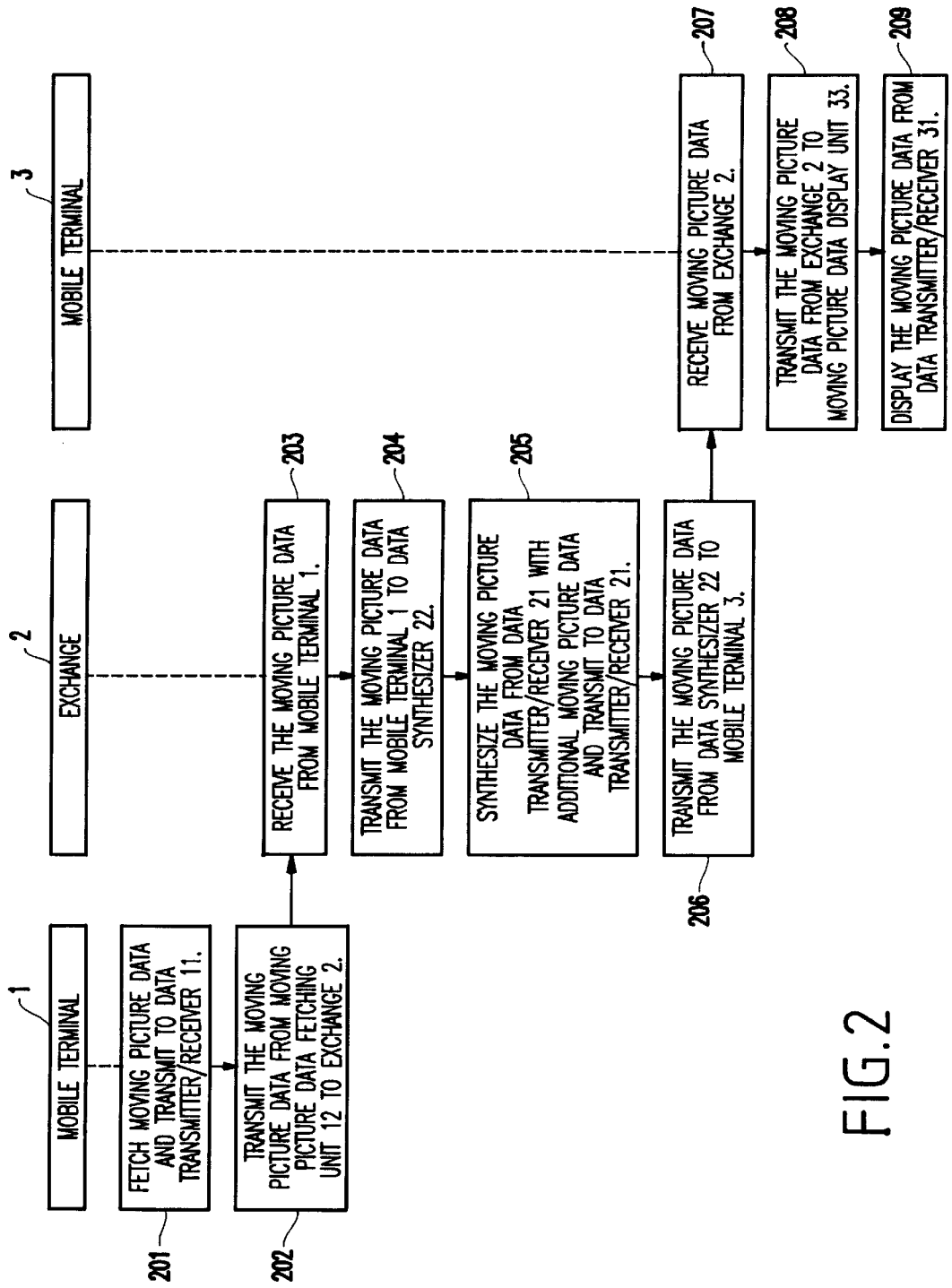
FIG. 2 shows a flow chart for explaining an example of the operation of the moving picture insertion system shown in FIG. 1.

We first refer to FIG. 2 to describe an example of an operation in exchange 2 in which additional moving picture data are inserted into moving picture data that are being communicated between mobile terminals 1 and 3. In this example, the process of inserting moving picture data is not performed in mobile terminals 1 and 3.

In mobile terminal 1, moving picture data fetching unit 12 fetches moving picture data and sends it to data transmitter/receiver 11 in Step 201. Next, in Step 202, data transmitter/receiver 11 transmits the moving picture data from moving picture data fetching unit 12 to data transmitter/receiver 21 in exchange 2.

In exchange 2, data transmitter/receiver 21 receives moving picture data from data transmitter/receiver 11 in mobile terminal 1 in Step 203. Then, in Step 204, data transmitter/receiver 21 sends the moving picture data that were received in Step 203 to data synthesizer 22. Data synthesizer 22 then synthesizes the moving picture data from data transmitter/receiver 21 with additional moving picture data (for example, a weather forecast) and transmits the synthesized moving picture data to data transmitter/receiver 21 in Step 205. Data transmitter/receiver 21 then sends the moving picture data from data synthesizer 22 to data transmitter/receiver 31 in mobile terminal 3 in Step 206.

In mobile terminal 3, data transmitter/receiver 31 receives the moving picture data from data transmitter/receiver 21 in exchange 2 in Step 207. Data transmitter/receiver 31 then sends the moving picture data that were received in Step 207 to moving picture data display unit 33 in Step 208. In Step 209, moving picture data display unit 33 displays the moving picture data from data transmitter/receiver 31.

Figure 3:
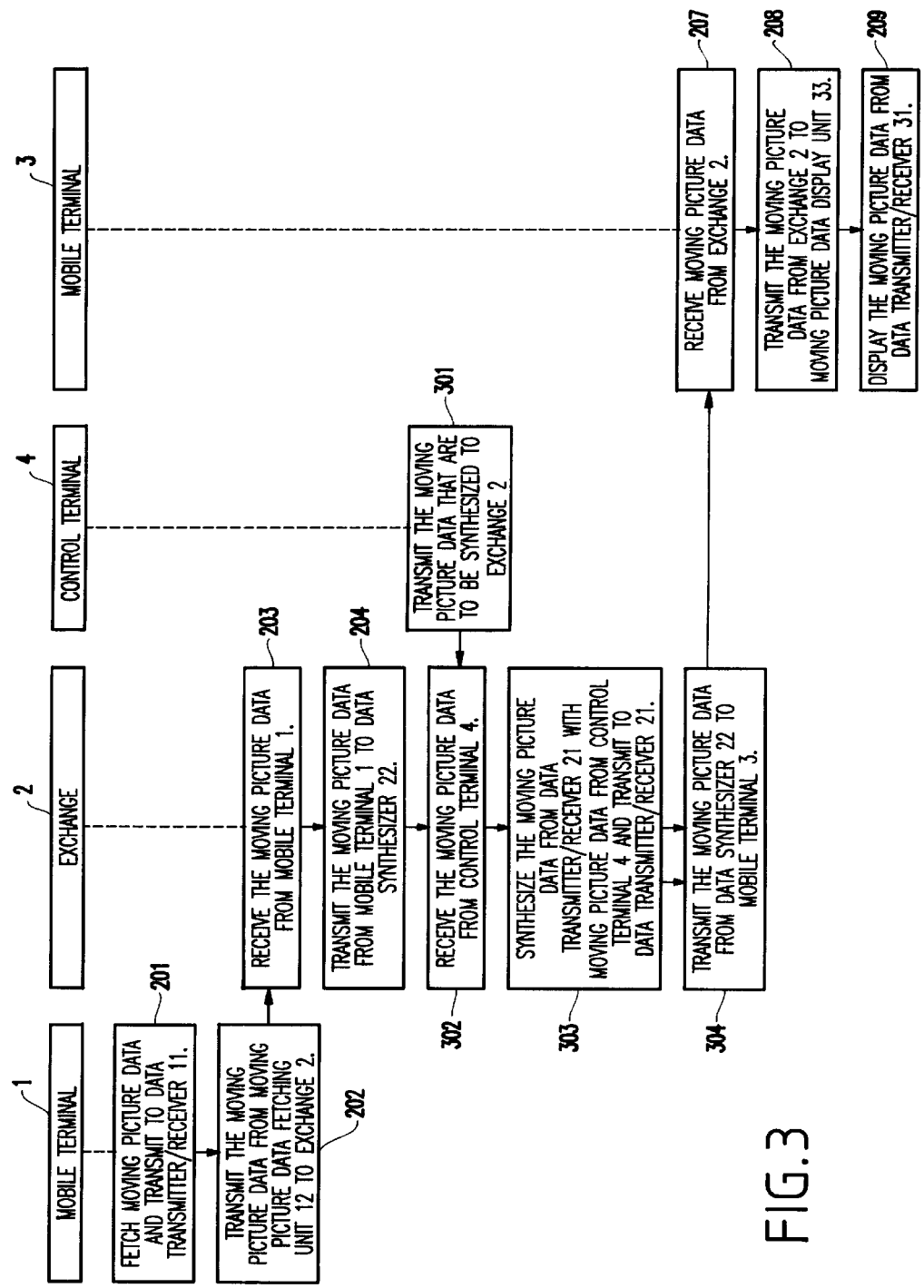
FIG. 3 shows a flow chart for explaining another example of the operation of the moving picture insertion system that is shown in FIG. 1.

Referring now to FIG. 3, explanation is next presented regarding an example of the operations in exchange 2 for inserting additional moving picture data that have been transmitted in from control terminal 4 into moving picture data that are being communicated between mobile terminals 1 and 3. In this example, the process of inserting moving picture data is not carried out at mobile terminals 1 and 3.

As shown in FIG. 3, this example differs from the example shown in FIG. 2 in that the processing of Steps 301 to 303 is carried out in place of the processing carried out in Step 205. Processing is otherwise the same as the example shown in FIG. 2, and redundant explanation is omitted.

In Step 301, control terminal 4 transmits to data synthesizer 22 in exchange 2 the additional moving picture data that are to be synthesized with the moving picture data that are being communicated between mobile terminals 1 and 3.

In exchange 2, data synthesizer 22 receives the moving picture data from control terminal 4 in Step 302. Next, in Step 303, data synthesizer 22 synthesizes the moving picture data that were received in Step 302 and the moving picture data that were transmitted from data transmitter/receiver 21 in Step 204 and transmits the synthesized moving picture data to data transmitter/receiver 21.

Figure 4:
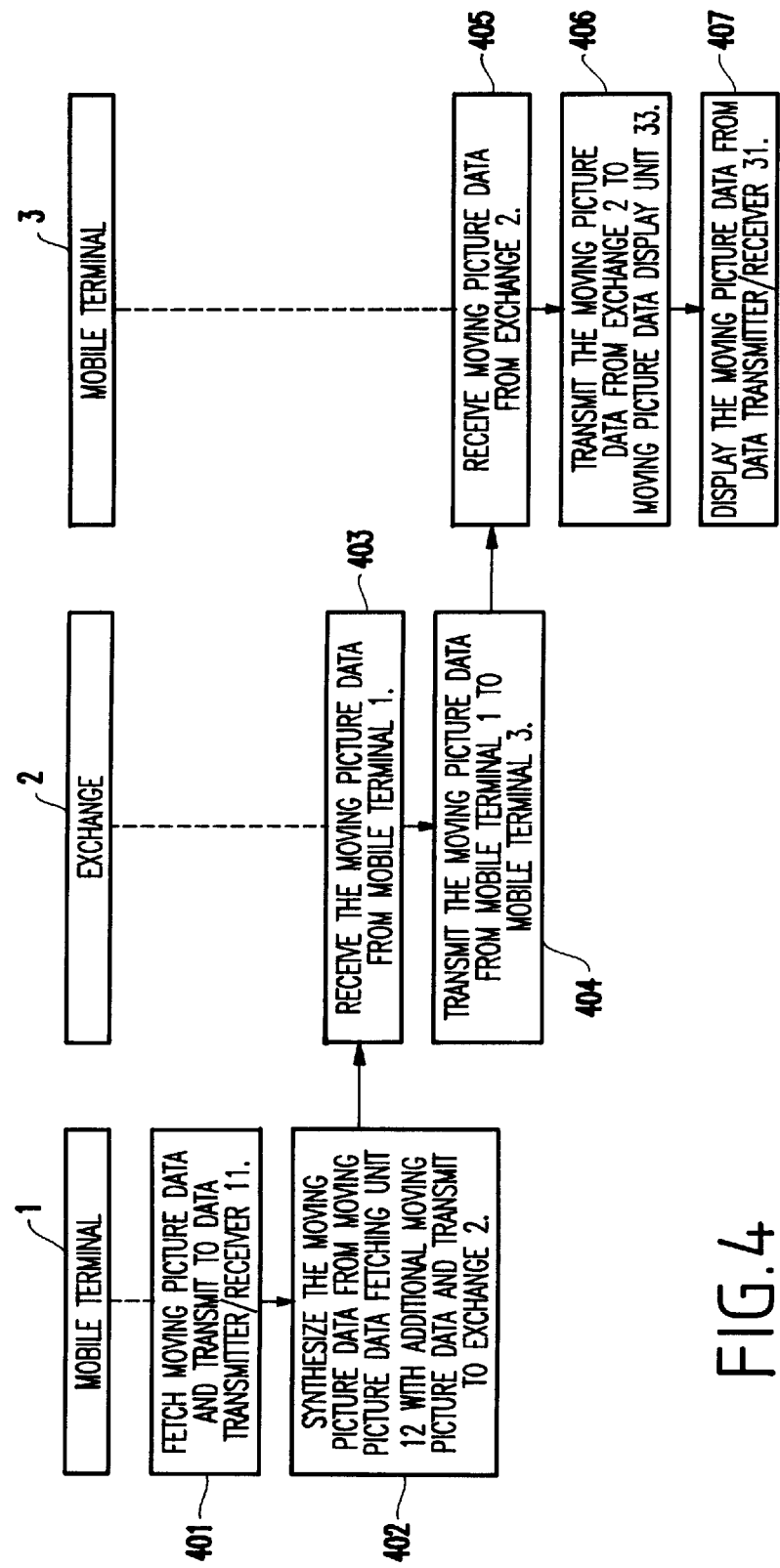
FIG. 4 is a flow chart for explaining another example of the operation of the moving picture insertion system that is shown in FIG. 1.
Figure 5:
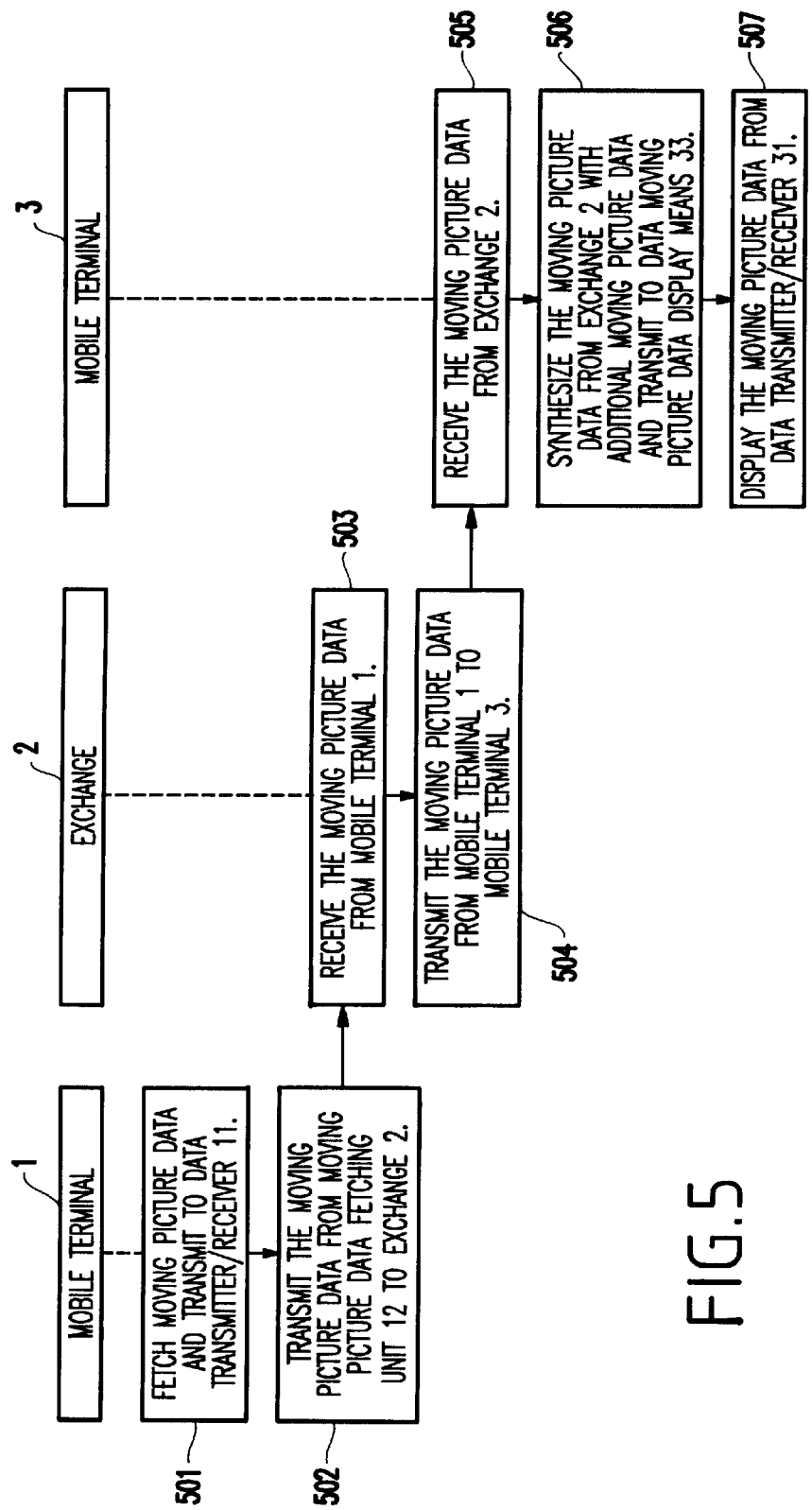
FIG. 5 is a flow chart for explaining another example of the operation of the moving picture insertion system that is shown in FIG. 1.

We now refer to FIG. 4 to explain an example of the operations for inserting additional moving picture data into moving picture data that are being communicated between mobile terminals 1 and 3 in the mobile terminal that transmits the moving picture data (in this case, mobile terminal 1). In this example, processing for inserting moving picture data is not carried out in mobile terminal 3 or in exchange 2.

In mobile terminal 1, moving picture data fetching unit 12 fetches moving picture data and transmits the data to data transmitter/receiver 11 in Step 401. Data transmitter/receiver 11 next synthesizes the moving picture data from moving picture data fetching unit 12 with additional moving picture data (for example, a mark or symbol such as a mascot) and transmits the synthesized moving picture data to data transmitter/receiver 21 in exchange 2 in Step 402.

In exchange 2, data transmitter/receiver 21 receives the moving picture data from data transmitter/receiver 11 in mobile terminal 1 in Step 403. Data transmitter/receiver 21 then transmits the moving picture data that were received in Step 403 to data transmitter/receiver 31 in mobile terminal 3 in Step 404.

In mobile terminal 3, data transmitter/receiver 31 receives the moving picture data from data transmitter/receiver 21 in exchange 2 in Step 405. Data transmitter/receiver 31 then transmits the moving picture data that were received in Step 405 to moving picture data display unit 33 in Step 406. In Step 407, moving picture data display unit 33 displays the moving picture data from data transmitter/receiver 31.

Explanation is now presented regarding an example of the operations for inserting additional moving picture data into moving picture data that are being communicated between mobile terminals 1 and 3 in the mobile terminal that receives the moving picture data (in this case, mobile terminal 3). In this example, processing for inserting moving picture data is not carried out in mobile terminal 1 or in exchange 2.

In mobile terminal 1, moving picture data fetching unit 12 fetches moving picture data and transmits the data to data transmitter/receiver 11 in Step 501. Data transmitter/receiver next transmits the moving picture data from moving picture data fetching unit 12 to data transmitter/receiver 21 in exchange 2 in Step 502.

In exchange 2, data transmitter/receiver 21 receives the moving picture data from data transmitter/receiver 11 in mobile terminal 1 in Step 503. Data transmitter/receiver 21 next transmits the moving picture data that were received in Step 503 to data transmitter/receiver 31 in mobile terminal 3 in Step 504.

In mobile terminal 3, data transmitter/receiver 31 receives the moving picture data from data transmitter/receiver 21 in exchange 2 in Step 505. Data transmitter/receiver 31 then synthesizes the moving picture data that were received in Step 505 with additional moving picture data (for example, a mascot or other mark or symbol) and transmits the synthesized moving picture data to moving picture data display unit 33 in Step 506. Moving picture data display unit 33 then displays the moving picture data from data transmitter/receiver 31 in Step 507.

Different methods can be considered for directing the execution of the moving picture insertion process to mobile terminals 1 and 3 and exchange 2, including for example, a method in which the moving picture insertion process is directed from the mobile terminal that transmits the moving picture data to exchange 2 and the mobile terminal that is the transmission destination of the moving picture data, or a method in which the moving picture insertion process is carried out through independent determinations in the mobile terminals and exchange 2. However, the present invention is not limited to these methods, and other methods may be used.

Second Embodiment

Figure 6:
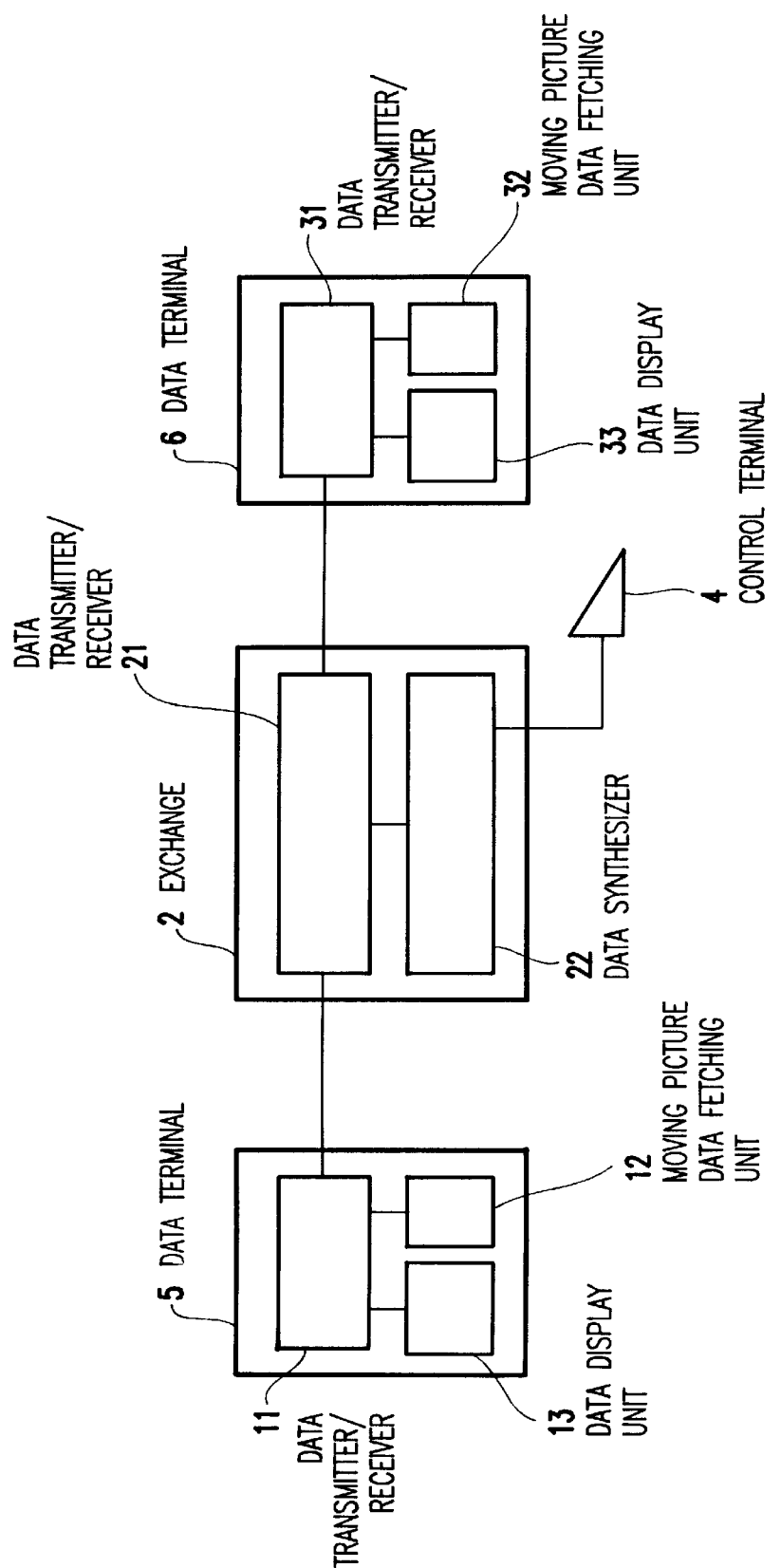
FIG. 6 shows a moving picture insertion system according to the second embodiment of the present invention.

As shown in FIG. 6, the moving picture insertion system of this embodiment differs from the moving picture insertion system that is shown in FIG. 1 in that data terminals 5 and 6 are provided in place of mobile terminals 1 and 3 and communication is realized between data terminals 5 and 6 and exchange 2 by means of dedicated cables such as telephone lines.

Data terminals 5 and 6 have a construction that is equivalent to that of mobile terminals 1 and 3, and the configuration other than data terminals 5 and 6 is also equivalent to that of the moving picture insertion system shown in FIG. 1, and explanation of the operations is therefore here omitted.

While preferred embodiments of the present invention have been described using specific terms, such description is for illustrative purposes only, and it is to be understood that changes and variations may be made without departing from the spirit or scope of the following claims.

What is claimed is:

1. A moving picture insertion system for inserting additional moving picture data into moving picture data that are being communicated between terminals, said moving picture insertion system comprising:

a plurality of terminals that each communicate moving picture data to each other; and an exchange that controls the communication between said terminals, wherein said exchange includes a first means for inserting additional moving picture data into moving picture data that are being communicated between said terminals and wherein at least one of said plurality of terminals comprises a second means for inserting additional moving picture data into the moving picture data that are being communicated between said terminals.

2. A system according to claim 1, wherein said second means inserts said additional moving picture data when said moving picture data are being transmitted from said at least one terminal or when said moving picture data are being received by said at least one terminal.

3. A system according to claim 2, wherein said exchange comprises:

a first data transmission/reception means that performs transmission/reception processes for transmitting and receiving moving picture data that are being communicated between said terminals and that transmits synthesized moving picture data to the terminal of a communication partner; and a data synthesizing means that synthesizes moving picture data that have been received by said data transmission/reception means with additional moving picture data and outputs to said data transmission/reception means.

4. A system according to claim 3, further comprising a control terminal that transmits additional moving picture data that are to be inserted into moving picture data that are being communicated between said terminals to said data synthesizing means in said exchange, wherein said data synthesizing means synthesizes moving picture data that have been received by said first data transmission/reception means with additional moving picture data that have been transmitted from said control terminal, and wherein said first data transmission/reception means transmits moving picture data that have been synthesized by said data synthesizing means to the terminal of a communication partner.

5. A system according to claim 4, wherein at least one of said plurality of terminals further comprises:

moving picture data fetching means for fetching moving picture data that are transmitted to the terminal of a communication partner;

a data display means for displaying moving picture data; and a second data transmission/reception means that performs a transmission process in which moving picture data that have been fetched by said moving picture data fetching means are transmitted to said exchange and a reception process in which moving picture data that are transmitted from said exchange are received, and that directs display of said received moving picture data to said data display means, wherein, in a case in which additional moving picture data are to be inserted into moving picture data that have been fetched by said moving picture data fetching means when transmitting the moving picture data to said exchange, said second data transmission/reception means synthesizes the moving picture data that have been fetched by said moving picture data fetching means with the additional moving picture data and transmits the synthesized moving picture data to said exchange; and, in a case in which additional moving picture data are to be inserted into moving picture data that have been transmitted from said exchange when the moving picture data re being received, said second data transmission/reception means synthesizes the moving picture data that have been transmitted from said exchange with the additional moving picture data and directs display of the synthesized moving picture data to said data display means.

6. A system according to claim 1, wherein said plurality of terminals are mobile terminals that perform radiocommunication with said exchange.

7. A system according to claim 5, wherein said terminals communicate with said exchange by way of dedicated lines.

8. A system according to claim 1, wherein said exchange comprises:

a data transmission/reception means that performs transmission/reception processes for transmitting and receiving moving picture data that are being communicated between said terminals and that transmits synthesized moving picture data to the terminal of a communication partner; and a data synthesizing means that synthesizes moving picture data that have been received by said data transmission/reception means with additional moving picture data and outputs to said data transmission/reception means.

9. A system according to claim 8, further comprising a control terminal that transmits additional moving picture data that are to be inserted into moving picture data that are being communicated between said terminals to said data synthesizing means in said exchange, wherein said data synthesizing means synthesizes moving picture data that have been received by said data transmission/reception means with additional moving picture data that have been transmitted from said control terminal, and wherein said data transmission/reception means transmits moving picture data that have been synthesized by said data synthesizing means to the terminal of a communication partner.

10. A system according to claim 9, wherein said plurality of terminals are mobile terminals that perform radiocommunication with said exchange.

11. A system according to claim 9, wherein said terminals communicate with said exchange by way of dedicated lines.

12. A moving picture insertion system for inserting additional moving picture data into moving picture data that are being communicated between terminals, said moving picture insertion system comprising:

a plurality of terminals that each communicate moving picture data with each other; and an exchange that controls communication between said terminals, wherein at least one of said plurality of terminals includes means for inserting additional moving picture data into the moving picture data when said moving picture data are transmitted or received.

13. A system according to claim 12, wherein said at least one terminal comprises:

a moving picture data fetching means for fetching moving picture dat that are transmitted to the terminal of a communication partner, a data display means for displaying moving picture data; and a data transmission/reception means that performs a transmission process in which moving picture data that have been fetched by said moving picture data fetching means are transmitted to said exchange and a reception process in which moving picture data that are transmitted from said exchange are received, and that directs display of said received moving picture data to said data display mean, wherein, in a case in which additional moving picture data are to be inserted into moving picture data that have been fetched by said moving picture data fetching means when transmitting the moving picture data to said exchange, said data transmission/reception means synthesizes the moving picture data that have been fetched by said moving picture data fetching means with the additional moving picture data and transmits the synthesized moving picture data to said exchange; and, in a case in which additional moving picture data are to be inserted into moving picture data that have been transmitted from said exchange when the moving picture data are being received, said data transmission/reception means synthesizes the moving picture data that have been transmitted in from said exchange with the additional moving picture data and directs display of the synthesized moving picture data to said data display means.

14. A system according to claim 13, wherein said plurality of terminals are mobile terminals perform radiocommunication with said exchange.

15. A system according to claim 13, wherein said terminals communicate with said exchange by way of dedicated lines.

16. A terminal comprising:

means for communication moving picture data by way of an exchange; and first means for inserting additional moving picture data into the moving picture data when the moving picture data are being transmitted or received.

17. A terminal according to claim 16, comprising:

a moving picture data fetching means for fetching moving picture data that are transmitted to the terminal of a communication partner;

a data display means for displaying moving picture data; and a data transmission/reception means that performs a transmission process in which moving picture data that have been fetched by said moving picture data fetching means are transmitted to said exchange and a reception process in which moving picture data that are transmitted from said exchange are received, and that directs display of said received moving picture data to said data display means, wherein, in a case in which additional moving picture data are to be inserted into moving picture data that have been fetched by said moving picture data fetching means when transmitting the moving picture data to said exchange, said data transmission/reception means synthesizes the moving picture data that have been fetched by said moving picture data fetching means with the additional moving picture data and transmits the synthesized moving picture data to said exchange; and, in a case in which additional moving picture data are to be inserted into moving picture data that have been transmitted from said exchange when the moving picture data are being received, said data transmission/reception means synthesizes the moving picture data that have been transmitted from said exchange with the additional moving picture data and directs display of the synthesized moving picture data to said data display means.

18. A terminal according to claim 17, wherein said terminal comprises a mobile terminal that performs radiocommunication with said exchange.

19. A terminal according to claim 17 that communicates with said exchange by way of a dedicated line.

20. The system of claim 1, wherein each of said plurality of terminals comprises a second means for inserting additional moving picture data into moving picture data into moving picture data that are being communicated between said terminals.

21. The terminal of claim 16, wherein said exchange comprises second means for inserting additional moving data into the moving picture data when the moving picture data are being transmitted or received.

22. The system of claim 1, wherein said first means is adapted to insert additional moving picture data into moving picture data that are being communicated between at least three terminals.

23. The system of claim 12, wherein said means is adapted to insert additional moving picture data into moving picture data that are being communicated between at least three terminals.

24. The terminal of claim 16, wherein said means is adapted to insert additional moving picture data into moving picture data that are being communicated between at least three terminals.

25. The system of claim 1, further comprising a control terminal for said exchange which includes said first means.

26. The system of claim 12, further comprising a control terminal for said exchange which also include means for inserting additional moving picture data into moving picture data that are being communicated between said terminals.

27. The terminal of claim 16, wherein said exchange comprises a control terminal which also include means for inserting additional moving picture data into moving picture data that are being communicated between said terminals.

* * * * *